US008439609B2

(12) United States Patent
Woodruff et al.

(10) Patent No.: US 8,439,609 B2
(45) Date of Patent: May 14, 2013

(54) MICRO-JET COOLING OF CUTTING TOOLS

(75) Inventors: Douglas J. Woodruff, Atlantic Mine, MI (US); Gary W. Pennala, Calumet, MI (US); William J. Endres, Houghton, MI (US); Nicole Barna, Appleton, WI (US); Quincy Schultz, Madison Heights, MI (US); David Thomasini, Green Bay, WI (US); Matthew Zblewski, Franklin, WI (US)

(73) Assignee: Michigan Technological University, Houghton, MI (US)

( * ) Notice: Subject to any disclaimer, the term of this patent is extended or adjusted under 35 U.S.C. 154(b) by 0 days.

(21) Appl. No.: 13/251,870

(22) Filed: Oct. 3, 2011

(65) Prior Publication Data
US 2012/0082518 A1    Apr. 5, 2012

Related U.S. Application Data

(60) Provisional application No. 61/389,498, filed on Oct. 4, 2010.

(51) Int. Cl.
*B23B 27/10* (2006.01)
(52) U.S. Cl.
USPC ................. 407/11; 407/33; 408/57
(58) Field of Classification Search ........... 407/11, 407/33–35, 45, 120, 113; 408/56, 57
See application file for complete search history.

(56) References Cited

U.S. PATENT DOCUMENTS

| 3,077,802 | A | * | 2/1963 | Philip ........................... 82/173 |
| 3,323,195 | A | * | 6/1967 | Vanderjagt .................... 407/11 |
| 3,359,837 | A | | 12/1967 | Andreasson |
| 3,434,554 | A | | 3/1969 | Bower, Jr. |
| 3,798,726 | A | * | 3/1974 | Dudley ......................... 407/11 |
| 3,889,520 | A | * | 6/1975 | Stoferle et al. ................ 73/37.5 |
| 3,971,114 | A | * | 7/1976 | Dudley ......................... 407/120 |
| 4,151,869 | A | | 5/1979 | Halloran et al. |
| 4,535,216 | A | * | 8/1985 | Cassidenti .................... 219/68 |
| 4,579,488 | A | * | 4/1986 | Griffin ........................ 409/136 |

(Continued)

FOREIGN PATENT DOCUMENTS

| DE | 3429842 A | * | 2/1986 |
| DE | 19730539 | | 4/1999 |

(Continued)

OTHER PUBLICATIONS

International Preliminary Report on Patentability for Application No. PCT/US2011/054583 dated Oct. 16, 2012 (25 pages).

(Continued)

*Primary Examiner* — Andrea Wellington
*Assistant Examiner* — Sara Addisu
(74) *Attorney, Agent, or Firm* — Michael Best & Friedrich LLP

(57) ABSTRACT

A cutting tool includes an insert defining a flank face, a rake face, and a cutting edge between the flank face and rake face. The cutting tool includes micro-nozzles formed in at least one of the tool body and the insert, and aimed at the cutting edge. Each micro-nozzle generates a micro jet of cutting fluid in close proximity to the cutting edge and adjacent to at least one of the flank face and the rake face.

23 Claims, 7 Drawing Sheets

U.S. PATENT DOCUMENTS

| | | | |
|---|---|---|---|
| 4,621,547 A | 11/1986 | Yankoff | |
| 5,237,894 A | 8/1993 | Lindeke | |
| 5,275,633 A | 1/1994 | Johansson et al. | |
| 5,346,335 A * | 9/1994 | Harpaz et al. | 407/11 |
| RE34,929 E | 5/1995 | Kristen | |
| 5,439,327 A * | 8/1995 | Wertheim | 407/11 |
| 5,542,792 A | 8/1996 | Krueger et al. | |
| 5,718,156 A * | 2/1998 | Lagrolet et al. | 82/1.11 |
| 5,775,854 A | 7/1998 | Wertheim | |
| 5,799,553 A | 9/1998 | Billatos | |
| 5,848,348 A | 12/1998 | Dennis | |
| 5,901,623 A | 5/1999 | Hong | |
| 5,931,616 A | 8/1999 | Daub | |
| 6,053,669 A * | 4/2000 | Lagerberg | 407/11 |
| 6,117,612 A | 9/2000 | Halloran et al. | |
| 6,164,827 A | 12/2000 | Eitzenberger | |
| 6,299,388 B1 * | 10/2001 | Slabe | 407/11 |
| 6,447,218 B1 * | 9/2002 | Lagerberg | 407/114 |
| 6,634,835 B1 | 10/2003 | Smith | |
| 6,637,984 B2 * | 10/2003 | Murakawa et al. | 407/11 |
| 6,705,805 B2 * | 3/2004 | Lagerberg | 407/11 |
| 6,957,933 B2 * | 10/2005 | Pachao-Morbitzer et al. | 407/11 |
| 7,158,159 B2 | 1/2007 | Beerling et al. | |
| 7,252,024 B2 * | 8/2007 | Zurecki et al. | 82/1.11 |
| 7,637,187 B2 * | 12/2009 | Zurecki et al. | 82/1.11 |
| 7,735,748 B1 | 6/2010 | Scheer | |
| 7,775,751 B2 | 8/2010 | Hecht et al. | |
| 7,802,947 B2 | 9/2010 | Endres | |
| 8,047,748 B2 * | 11/2011 | Endres | 407/113 |
| 2001/0007215 A1 | 7/2001 | Murata et al. | |
| 2003/0110781 A1 * | 6/2003 | Zurecki et al. | 62/64 |
| 2005/0047883 A1 | 3/2005 | Bixler | |
| 2006/0123801 A1 * | 6/2006 | Jackson | 62/52.1 |
| 2006/0140728 A1 * | 6/2006 | Giannetti | 407/11 |
| 2006/0263153 A1 * | 11/2006 | Isaksson | 407/113 |
| 2007/0283794 A1 | 12/2007 | Giannetti | |
| 2007/0286689 A1 | 12/2007 | Giannetti | |
| 2008/0279644 A1 | 11/2008 | Endres | |
| 2009/0320655 A1 * | 12/2009 | Grant | 82/50 |
| 2010/0272529 A1 * | 10/2010 | Rozzi et al. | 408/56 |

FOREIGN PATENT DOCUMENTS

| | | | |
|---|---|---|---|
| DE | 202006011535 | | 9/2006 |
| EP | 123387 A * | | 10/1984 |
| EP | 599393 | | 6/1994 |
| EP | 1637257 | | 3/2006 |
| JP | 10094904 A * | | 4/1998 |
| JP | 2003071608 A * | | 3/2003 |
| JP | 2003266208 A * | | 9/2003 |
| JP | 2006136953 A * | | 6/2006 |

OTHER PUBLICATIONS

PCT/US2008/062753 International Search Report and Written Opinion dated Aug. 21, 2008 (12 pages).

Celata, G.P., et al., "Experimental Investigation of Hydraulic and Single-Phase Heat Transfer in 0.130-MM Capillary Tube," Microscale Thermophysical Engineering, vol. 6, pp. 85-97, 2002.

Chiou, Richard Y., et al., "The Effect of an Embedded Heat Pipe in a Cutting Tool on Temperature and Wear", Proceedings of IMECE, 2003 ASME International Mechanical Engineering Congress & Exposition, Nov. 15-21, 2003.

Gao, P., et al., "Scale Effects on Hydrodynamics and Heat Transfer in Two-Dimensional Mini and Microchannels," International Journal of Thermal Sciences, vol. 4, pp. 1017-1027, 2002.

Jeffries, Dr. Neal P., et al., "Internal Cooling of Metal-Cutting Tools", Technical Paper, Society of Manufacturing Engineers, 1970, 10 pages.

Jeffries, Dr. Neal P., et al., "New Internal Cooling Method Cuts Turning Tool Wear", Cutting Tool Engineering, vol. 22, Issue 9, pp. 8-10, Sep. 1970.

Lelea, D., et al., "The Experimental Research on Microtube Heat Transfer and Fluid Flow of Distilled Water," International Journal of Heat and Mass Transfer, vol. 47, pp. 2817-2830, 2004.

Maekawa, Katsuhiro, et al., "Finite Element Analysis of Temperature and Stresses within an Internally Cooled Cutting Tool", Bull. Japan Soc. of Prec. Engg., vol. 23, No. 3, pp. 243-246, Sep. 1989.

Maekawa, Katsuhiro, et al., "Thermal Analysis of Internally Cooled Cutting Tools", [JSPE-57-11] ['91-11-2011]—contains an English abstract and figures described in English.

Peng, X. F., et al., 1995, "The Effect of Thermofluid and Geometrical Parameters on Convection of Liquid through Rectangular Microchannels," International Journal of Heat and Mass Transfer, vol. 38, No. 4, pp. 755-758, 1995.

Reznikov, A. N., et al., "Cutting Tools with a Self-Cooling System", Stanki i Instrument, vol. 58, Issue 2, pp. 18-19, 1987.

Reznikov, A.N., et al., "How Internal Cooling Affects the Temperature and Life of Cutting Tools", 1 i Instrument, vol. 60, No. 4, pp. 18-20, 1989.

Zhao, H., et al., "A Study of Flank Wear in Orthogonal Cutting with Internal Cooling", Wear, vol. 253, pp. 957-962, 2002.

EP 08755083.6 Extended European Search Report dated Jun. 20, 2011 (8 pages).

PCT/US2011/054583 International Search Report and Written Opinion dated Feb. 29, 2012 (9 pages).

* cited by examiner

MICRO-JET COOLING OF CUTTING TOOLS

This application claims priority to U.S. Provisional Patent Application No. 61/389,498 filed Oct. 4, 2010.

BACKGROUND

Cutting tools experience wear while machining as a result of a variety of thermo-mechanical mechanisms. Heat generated due to plastic deformation of the material being cut that is inherent with chip formation, coupled with the rubbing/friction between the chip and the machined surface against the tool, cause the tool to become hot during machining. These contacts—chip-tool and tool-workpiece—are the primary heat sources acting on the tool and, furthermore, they are of a stationary nature with respect to the tool and thus cause the tool to get quite hot. If the tool gets too hot, it can soften and suffer plastic deformation. Under more normal operating conditions, though, the tool does not soften but the natural wear rate does increase as the tool temperature increases. The primary process variables that affect tool temperature include cutting speed, feed rate and depth of cut, in decreasing order of the strength of their typical effect. Increasing any one of these variables leads to a greater material removal rate, which is desired, but also an increased wear rate which reduces tool life as measured in both time and volume of material removed.

In order to moderate tool temperatures to enable either a higher material removal rate while maintaining an acceptably low wear rate (and thus an acceptably high tool life), or to reduce wear rate (and thus increase tool life) for a given material removal rate, metal-working fluid is usually applied to the process. That fluid is often referred to as a "coolant" or "cutting fluid". It provides cooling as well as some lubrication, the latter in particular as it relates to flushing and evacuation of chips from the cutting zone. The cooling effectiveness of the cutting fluid is increased when there is an improvement in the rate of heat transfer from the process heat sources to the cutting fluid. Direct access to the heat sources is precluded since the heat sources are the highly stressed mechanical contact patches between the chip and the tool and the tool and the machined workpiece surface. Thus, this heat transfer mechanism involves initially the conduction from the heat sources through the tool followed by convection from the tool to the cutting fluid. Thus, the overall heat transfer into the cutting fluid is improved by one or both of the following: (1) higher velocity of flow of the cutting fluid over the tool, hence increasing the convective heat transfer coefficient of that fluid-solid interface and (2) minimizing the distance from the cutting fluid contact with the tool relative to the heat sources acting on the tool—the zone of chip contact with the rake face and the zone of flank face contact with the machined workpiece surface; the flank face contact includes the flank wear land that forms over time as the tool wears.

Flood cooling is a simple and common way of applying cutting fluid to the process. Growing in popularity is the use of streams or jets of coolant targeted at the cutting zone. These jets are often high in pressure (typically 500-1,000 psi is currently considered high pressure in these applications). One example is shown in FIG. 1 which shows a cutting tool, specifically an inserted end mill, comprising a Shank 1 and a Tool Body 3. Each cutting Insert 4 on this inserted end mill Tool Body 3 has a Nozzle 103 that produces a jet (not shown). Each Nozzle 103 is fed with cutting fluid from a central hole running down the axis of the cutting tool resulting in a jet of coolant spraying onto the rake face of the respective Insert 4. Rotating cutting tools, including but not limited to these end mills and other types of milling cutters, require a machine to have "through-spindle" coolant delivery, which has become common.

As another example in a cutting tool for lathe (turning and facing) processes, U.S. Pat. No. 4,621,547 and a commercial tool seen in FIG. 2 show how Jets 104 (typically one to three) can be exhausted toward the chip contact with the Rake Face 105 by forming a Nozzle 103 via a hole in the Insert Clamp 106 or a channel on the underside of the Insert Clamp 106 that then sits on the Rake Face 105 to create a fully encircled exhaust port (equivalently a nozzle) for the cutting fluid. In both cases (those illustrated in FIGS. 1 and 2) these Nozzles 103 are generally 1 mm in diameter (0.79 mm$^2$ cross-section) and larger. Photographs of actual fluid exhausting from the pair of exhaust ports on the cutting tool depicted in FIG. 2 show that the jets immediately diverge into wide sprays of cross-section much larger than that of the exhaust ports as opposed to non-diverging streams of cross-section similar to that of the exhaust ports.

The intent with the approach shown in FIGS. 1 and 2 is to employ a focused high-pressure jet to penetrate the narrowly exposed and often moving (e.g., with cutting tool rotation) chip-tool contact zone. By increasing the jet cross-sectional size and/or pressure, said penetration of the cutting fluid is facilitated by slightly bending the chip upward due to the force the coolant jet exerts on the backside of the chip, even to the extent of assisting in breaking the chip, which is also desirable and typically a significant goal of such systems (though chip breaking is not as much an issue in milling processes due to the natural chip breaking that occurs due to the inherently intermittent nature of milling). A larger jet can provide a greater force on the chip to improve cutting fluid penetration (by prying the chip slightly away from the rake face) and increase the likelihood of breaking the chip. The magnitude of the jet's force increases with the volumetric flow-rate and pressure (which translates into fluid velocity). In this sense, it is desirable and attempted to make the jets as large as possible. However, the maximum sizes of the nozzles and thus the resulting jets are limited in part by the space available to make the nozzle and also by the coolant pump capabilities. For instance, as a nozzle gets larger in cross-section the volumetric flow-rate gets higher for a given pressure. Once the volumetric flow-rate exceeds the pump's capacity, the pressure drops and thus a limit is reached on the force applied by the jet. When a nozzle is smaller and a pump's volumetric flow-rate capacity is underutilized, pressure is maintained but again with the dependence of the jet's applied force on volumetric flow-rate in addition to pressure, the force applied by the jet is limited. In other words, it is desirous under this approach to have nozzles/jets that are large and pumps that have high pressure and high volumetric flow-rate capacity; pumps of that sort are costly and a limitation.

SUMMARY

In one embodiment, the invention provides a cutting tool comprising: a shank; a tool body mounted to the shank; and an insert defining a flank face, a rake face, and a cutting edge between the flank face and rake face; micro-nozzles formed in at least one of the tool body and the insert, each micro-nozzle having an exit diameter of not more than 0.1 mm, the micro-nozzles aimed at the cutting edge; and a flow passage adapted for communication with a source of cutting fluid for the receipt of a flow of cutting fluid, the flow passage extending through at least a portion of the shank and a portion of the tool body, the flow passage being in close proximity to the insert locating surface to minimize the length-to-diameter ratio of the micro-nozzles, and the flow passage adapted to deliver the flow of cutting fluid to the micro-nozzles; wherein, each micro-nozzle generates a micro-jet of cutting fluid in close proximity to the cutting edge and adjacent to at least one of the flank face and the rake face.

In one embodiment, the flow passage includes a primary shank passage, which is centered on an axis of the shank. In one embodiment, the flow passage includes at least one secondary shank passage communicating with the primary shank passage and extending parallel but non-collinearly with the primary shank passage. In one embodiment, the cutting tool further comprises a central alignment pin interconnecting the tool body with the shank; wherein the flow passage includes a circumferential passage surrounding the central alignment pin and communicating with the secondary shank passage. In one embodiment, the tool body includes multiple layers of tool bodies; wherein the flow passage includes an intralayer passage communicating between the circumferential passage of one tool body layer and the circumferential passage of an adjacent tool body layer, positioned within the tool body a distance from the adjacent insert locating surface no more than 20 times the diameter of the micro-nozzles.

In one embodiment, the micro-nozzles include a plurality of rake-face micro-nozzles communicating through the tool body with the flow passage. In one embodiment, wherein the flow passage includes at least one intralayer passage communicating with the circumferential passage, the intralayer passage communicating with an axial flank passage which communicates with a plurality of micro-nozzles adjacent the flank face. In one embodiment, the flow passage includes a radial flank passage; wherein the micro-nozzles include a plurality of flank-face micro-nozzles receiving cutting fluid from the radial flank passage and generating flank-face micro-jets of cutting fluid adjacent to the flank face.

In one embodiment, the cutting tool further comprises an insert mounting provision extending through the rake face for mounting the insert to the tool body; wherein the micro-nozzles include rake-face micro-nozzles generating rake-face micro-jets of cutting fluid adjacent to the rake face and directed at the cutting edge; wherein the insert mounting provision is at least flush with the rake face to provide an unobstructed pathway for the rake-face micro jets to reach the cutting edge.

In one embodiment, the flank face includes flank-face micro jet clearance channels that are substantially aligned with the flank-face micro-nozzles providing an unobstructed pathway for the flank-face micro jets to reach the cutting edge. In one embodiment, the cutting tool further comprises support pillars between the flank-face micro jet clearance channels. In one embodiment, the cutting tool further comprises support pillars between the flank-face micro jet clearance channels; wherein the support pillars extend from the cutting edge to a surface of the insert that mates to the insert mounting surface on the tool body.

In one embodiment, the cutting tool further comprises divots on at least one of the rake face and the flank face near to the cutting edge; wherein the divots are substantially in line with the micro-jets to receive the micro-jets and direct the micro-jets toward the cutting edge. In one embodiment, the divots include micro-channels extending toward the cutting edge. In one embodiment, the micro-channels have a depth and a width; wherein each of the depth and width is less than 0.25 mm. In one embodiment, the micro-channels include crisscrossing micro-channels that form a field of bumps between portions of the micro-channels. In one embodiment, the bumps are spaced less than 0.25 mm from each other. In one embodiment, the micro-channels have a cross-section that is triangular. In one embodiment, the micro-channels have a cross-section that is square. In one embodiment, the micro-channels have a cross-section that is rounded.

The invention also provides a method of manufacturing a cutting tool comprising: forming a green-state insert of a green powder compact; sintering the green-state insert to form a hard insert; machining the hard insert to form a finished insert having a flank face, a rake face, and a cutting edge at the intersection of the flank face and the rake face; providing a shank defining a shank passage; providing a tool body defining a tool body passage; mounting the tool body to the shank such that the shank passage communicates with the tool body passage to define a flow passage; forming a plurality of micro-nozzles in at least one of the tool body and the insert, each micro-nozzle having an exit diameter of not more than 0.1 mm; mounting the finished insert to the tool body; placing the micro-nozzles in communication with the flow passage; placing the flow passage in communication with a flow of cutting fluid such that the cutting fluid may flow through the flow passage and out the micro-nozzles; and producing a micro-jet of cutting fluid with each of the micro-nozzles, each micro-jet of cutting fluid being directed adjacent one of the flank face and rake face, toward the cutting edge of the insert.

In one embodiment, forming a plurality of micro-nozzles includes defining a length of each micro-nozzle as the distance between the flow passage and the nozzle exit surface and defining a diameter of the micro-nozzle; and wherein mounting the tool body to the shank includes defining the flow passage in close proximity to the nozzle exit surface to minimize the length-to-diameter ratio of each micro-nozzle. In one embodiment, producing a micro-jet includes directing the micro-jet toward the cutting edge adjacent to at least one of the flank face and the rake face. In one embodiment, forming a green-state insert includes pressing into the green powder compact support pillars between the micro-nozzles. In one embodiment, forming a green-state insert includes pressing into the green powder compact divots on at least one of the rake face and the flank face proximate the cutting edge; and wherein producing a micro jet of cutting fluid with each of the micro-nozzles includes directing the micro-jets toward the divots such that the divots direct the micro jets toward the cutting edge. In one embodiment, forming divots includes forming micro-channels extending toward the cutting edge. In one embodiment, forming micro-channels includes scratching the micro-channels into the green-state powder compact. In one embodiment, forming micro-channels is executed with a laser.

Other aspects of the invention will become apparent by consideration of the detailed description and accompanying drawings.

DESCRIPTION OF THE INVENTION

Figure 1:
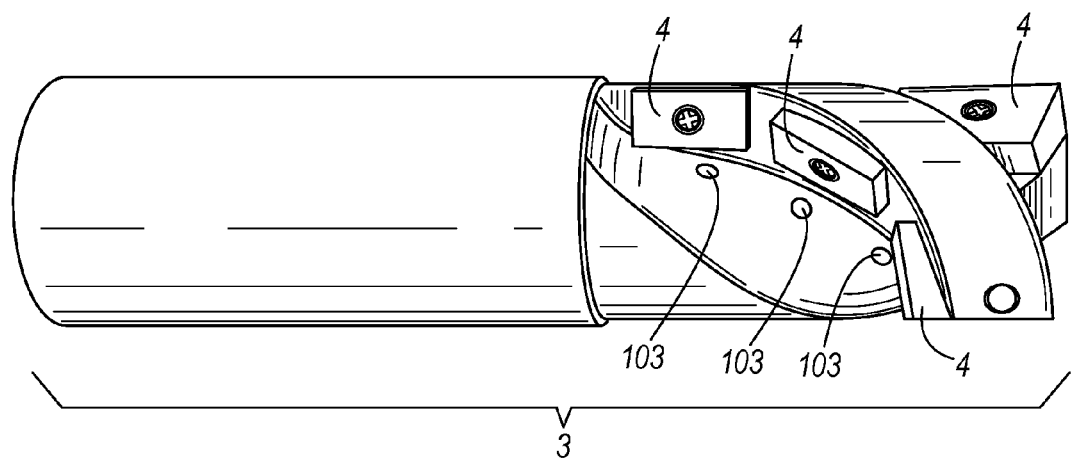
FIG. 1 illustrates a prior art inserted end mill incorporating a plurality of cooling fluid nozzles, one per insert.
Figure 2:
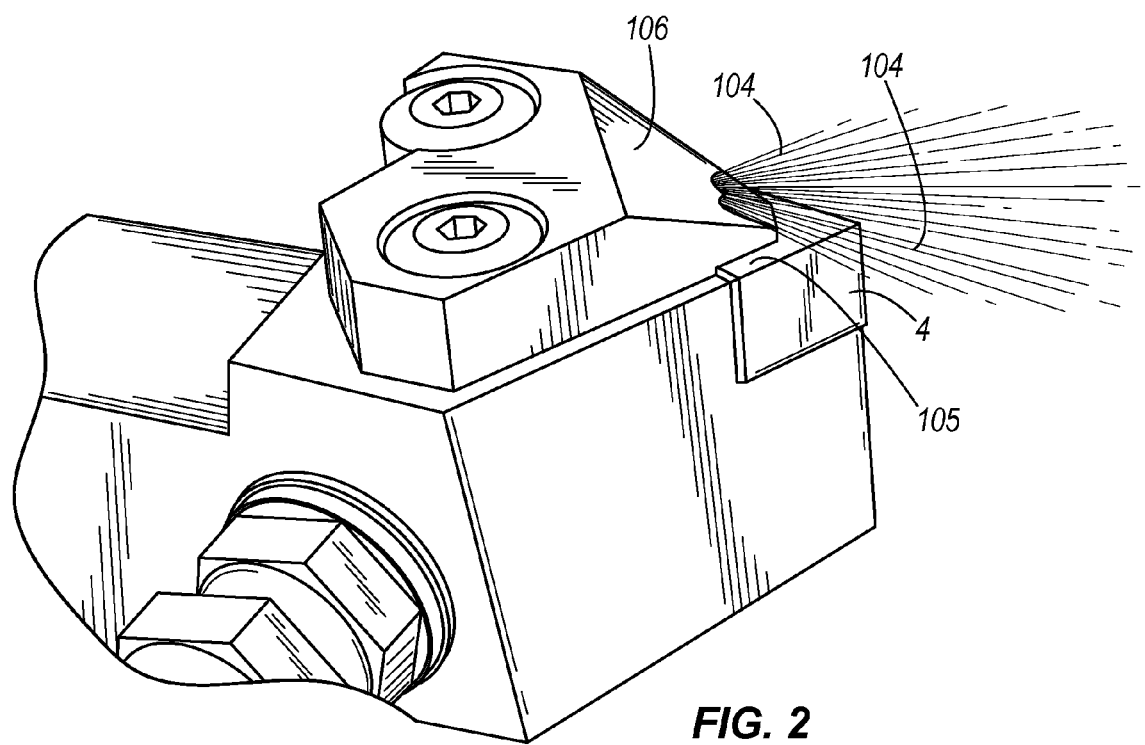
FIG. 2 illustrates a prior art insert clamped into a turning tool that includes cooling fluid nozzles.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

"Close proximity" is defined here as follows: In regard to providing cutting fluid for the sake of internally cooling, and exhausting of micro-jets from, a cutting insert, close proximity means that the cutting fluid is provided access to the region below the insert mounting surface at the location of the insert mounting hole. In regard to providing cutting fluid for the sake of cooling via rake-face and/or flank-face micro jets exhausted from the tool body, close proximity means that the cutting fluid is provided access to the region behind the outer tool body surface to which the micro-nozzles, created as micro-holes, are substantially perpendicular (otherwise referred to as the nozzle exit surface), the closest wall of the cutting fluid passage that intersects with the micro-nozzle micro-holes being approximately 20 micro-nozzle diameters or less from the micro-nozzle exit surface (i.e., such that micro-nozzle micro-holes exhibit a length-to-diameter ratio no more than approximately 20).

The purpose of this invention is not to break chips but rather to more effectively and evenly cool both sides (rake-face and flank-face) of the entire cutting edge of all inserts mounted to a tool body. The only similarity to the noted prior art background is that jets are used. In regard to the jets, the difference here is that the nozzles/jets are sized through a fundamentally different perspective, achieving a distinguishable difference in penetration to the heat source that is not possible under the mindset of bending the chip with the jet's force for improved penetration and hopeful breaking of the chip, all of which require a larger rather than a smaller nozzle/jet. The jets used in this invention are referred to as "micro-jets" and are not only an order of magnitude smaller in diameter for purposes of better penetration into the narrowly-exposed interfaces of interest, but as a result can also be distributed evenly along a cutting edge and aimed not only at the chip-tool interface but also at the flank-workpiece interface. Furthermore, the insert employs macro- and micro-geometric features on the rake face and/or flank face near to the cutting edge that, without undue compromise of the structural integrity of the insert or structural support of the cutting edge, facilitate reception of the micro-jets exhausted from the tool body to both the rake face and flank face hence promoting even deeper penetration into these heat source regions. In an inserted end mill embodiment, cutting fluid passages are needed to transmit the cutting fluid source located at the spindle/cutting-tool axis to the regions within the tool body that are close to those outer tool body surfaces that are in close proximity to the insert. This is desired (1) so that such small micro-nozzles can be effectively manufactured (reasonable length-to-diameter ratio for the micro-holes that constitute the micro-nozzles) and (2) so that excessive fluid flow head/frictional losses do not result as would be the case if the micro-nozzle micro-holes were long/deep relative to their diameter. This transmission of cutting fluid to the tool-body regions in close proximity to the inserts is enabled with a layered construction of the tool body; this is not needed in a turning tool embodiment nor in a cylinder boring embodiment nor in a face-mill embodiment where inserts/teeth are distributed only in the angular/circumferential dimension and not substantially distributed in the axial dimension.

Figure 3:
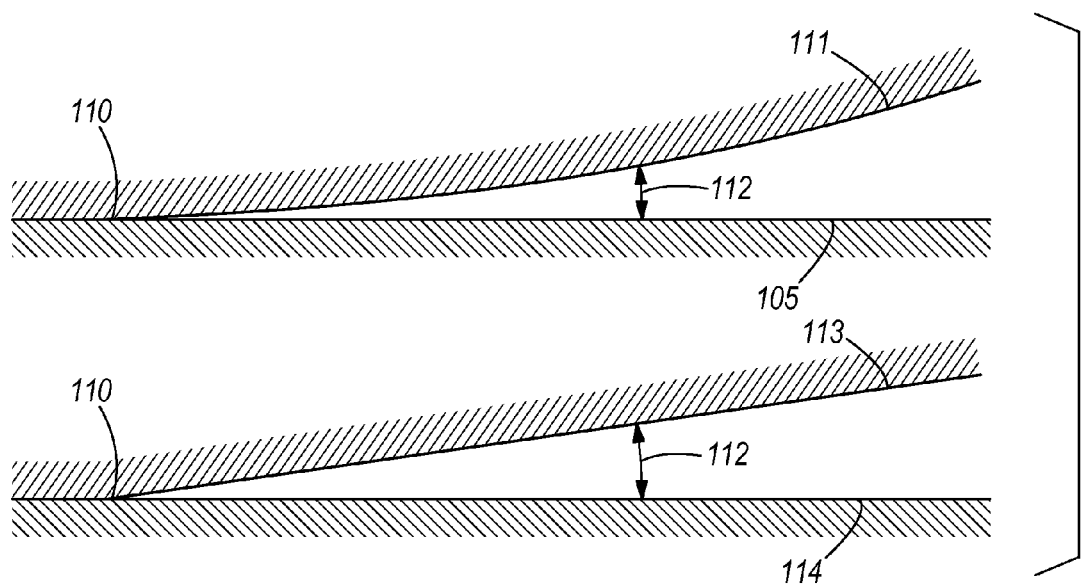
FIG. 3 illustrates a relatively narrow opening at the chip-rake interface and at the flank-workpiece interface.

Shown in FIG. 3 is an underlying premise of the invention through which substantially better penetration of the cutting fluid is achieved. The figure represents two solid bodies meeting at a point on the left (the Tip of the Opening 110) and narrowly-exposed in the rightward direction. The jet is applied from the right. The pair of bodies represents the Chip 111 and the Rake Face 105 in one case and, similarly in the other case, the Flank Face 113 and the Machined Workpiece Surface 114. In both cases the general Wedge Angle 112 of the exposure is typically around 3-10°; the radius of curvature of the Machined Workpiece Surface 114 tends to be much larger (either positive or negative curvature depending on turning, boring or milling) than that of the Chip 111 and thus is well approximated at this scale as "flat" (i.e., with no curvature), as shown. The general nature of the exposure to a cutting fluid jet is similarly narrow in both cases at the scale of interest here.

Figure 4:
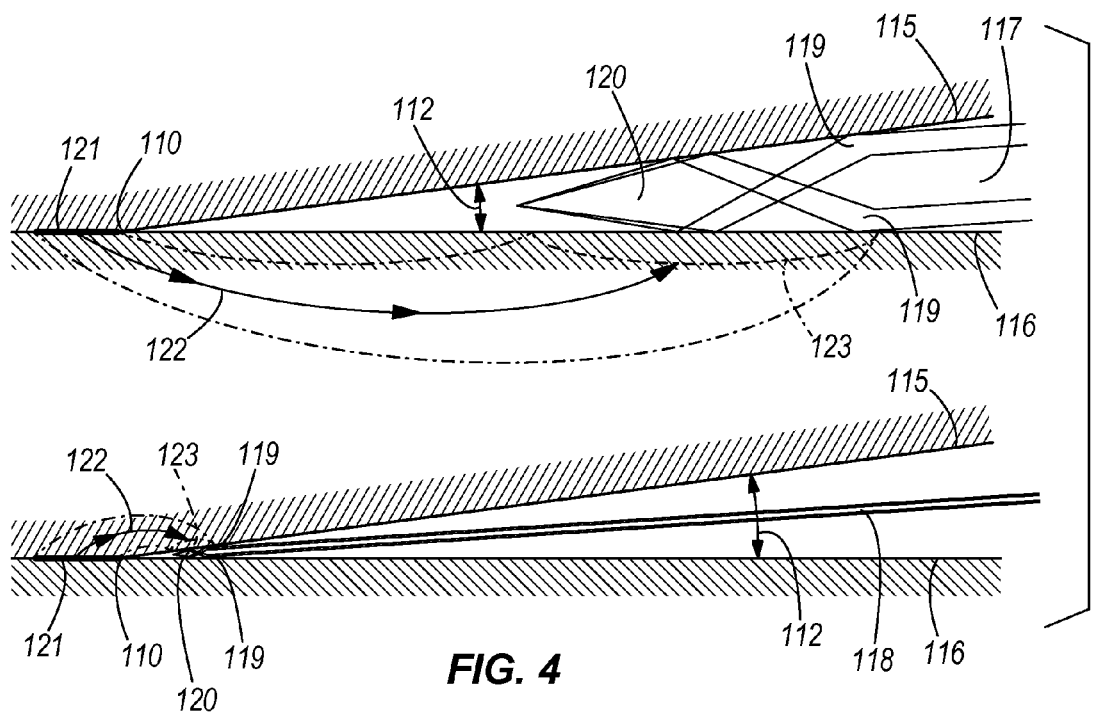
FIG. 4 illustrates how the narrowly-exposed openings receive a relatively large jet of cutting fluid and a jet of one tenth the diameter.

FIG. 4 shows, to scale, a generalized narrowly-exposed situation exhibiting two surfaces, Surface-A 115 and Surface-B 116 at a Wedge Angle 112 relative to one another and forming a Tip of the Opening 110. In one case a Large-Diameter Jet 117 (e.g., 1 mm in diameter) is applied; in another case a Micro-Jet 118 of one-tenth that diameter (thus, 0.1 mm) is applied. While it would be very difficult to capture all the thermo-mechanical mechanisms at work through simulation, in particular the potential for boundary-layer vaporization and micro-scale vapor lock formation at the two surfaces and in particular in the Tip of the Opening 110, the general nature of Jet-Edge Deflections 119 and Jet Self-Interference 120 are schematically illustrated; the cutting fluid stream does not actually disappear but rather changes direction into the third dimension (transversely, into and out of the page) at the indicated "end" (the Jet Self-Interference 120) where the self-interference is shown. This illustrates that the larger jet will have its flow disturbed and directed transversely at a point much further (to the right) from the Tip of the Opening 110 (the location of the edge of the Heat Source 121 to be cooled) resulting in a greater Through-Tool Conduction Path 122 from the Heat Source 121 to the cutting fluid contact with the tool surface at the Cooling Region 123 primarily located from the points of Jet-Edge Deflections 119 to the area of Jet Self-Interference 120.

The Micro-Jet 118 experiences similar fluid mechanics behavior as does the Large-Diameter Jet 117, but it does so at a proportionally smaller distance from the Tip of the Opening 110. Thus, viewing the challenge as a need to reduce the deleterious effects of cutting fluid self-interference as a means to promote jet penetration is different than the usual approach of targeting a Large-Diameter Jet 117 to the backside of the Chip 111. The usual approach hopes to slightly increase the Wedge Angle 112 between a Chip 111 and Rake Face 105 by slightly bending the Chip 111; though, no size of jet can increase the Wedge Angle 112 between the Flank Face 113 and Machined Workpiece Surface 114 since they are both highly rigid surfaces unlike the slightly/relatively compliant chip. Penetration with this invention is achieved in a fundamentally different manner that is counter to the objective of traditionally-sized jets that are made as large as the pumping system can support with its pressure and volumetric flow-rate. On that latter note, the micro-jet cooling approach uses flow rates that are two orders of magnitude lower (order of magnitude on the nozzle diameter then squared to get the nozzle cross-section) and thus can maintain high pressure even for cutting tools with many teeth/inserts and micro-jets. This point will be revisited later in regard to the use of multiple micro-jets to evenly distribute cooling along an entire cutting edge. It is noted that water-based cutting fluids, which are common though not the exclusive choice (e.g., oil based and cryogenic cutting fluids can be used), have a very high heat of vaporization, meaning that only small amounts (volumetric flow-rates) of cutting fluid are actually needed to absorb the heat before and while transitioning to a vapor (vapor having a much lower ability to absorb heat than does the liquid state and liquid-vapor transition).

The invention may be embodied in cutting tools for various processes including those where the cutting tool is not rotating, including among others turning and facing, as well as those where the cutting tool is rotating, including among others face milling, end milling, cylinder boring and drilling. It will be illustrated and described here for the case of end milling since that exhibits all features required to realize all the embodiments, specifically in that it includes multiple inserts distributed around the circumference of a rotating tool body as well as multiple inserts distributed along the axis of a rotating tool body.

Furthermore, it will be illustrated for an end mill that is small in diameter relative to the size of the cutting inserts, as that poses additional challenge in some respects while contradictory needs/challenges of larger diameter cutters (specifically, maintaining close proximity of the micro-nozzles to cutting fluid coming from a centralized source) will be described in words where appropriate.

Figure 5:
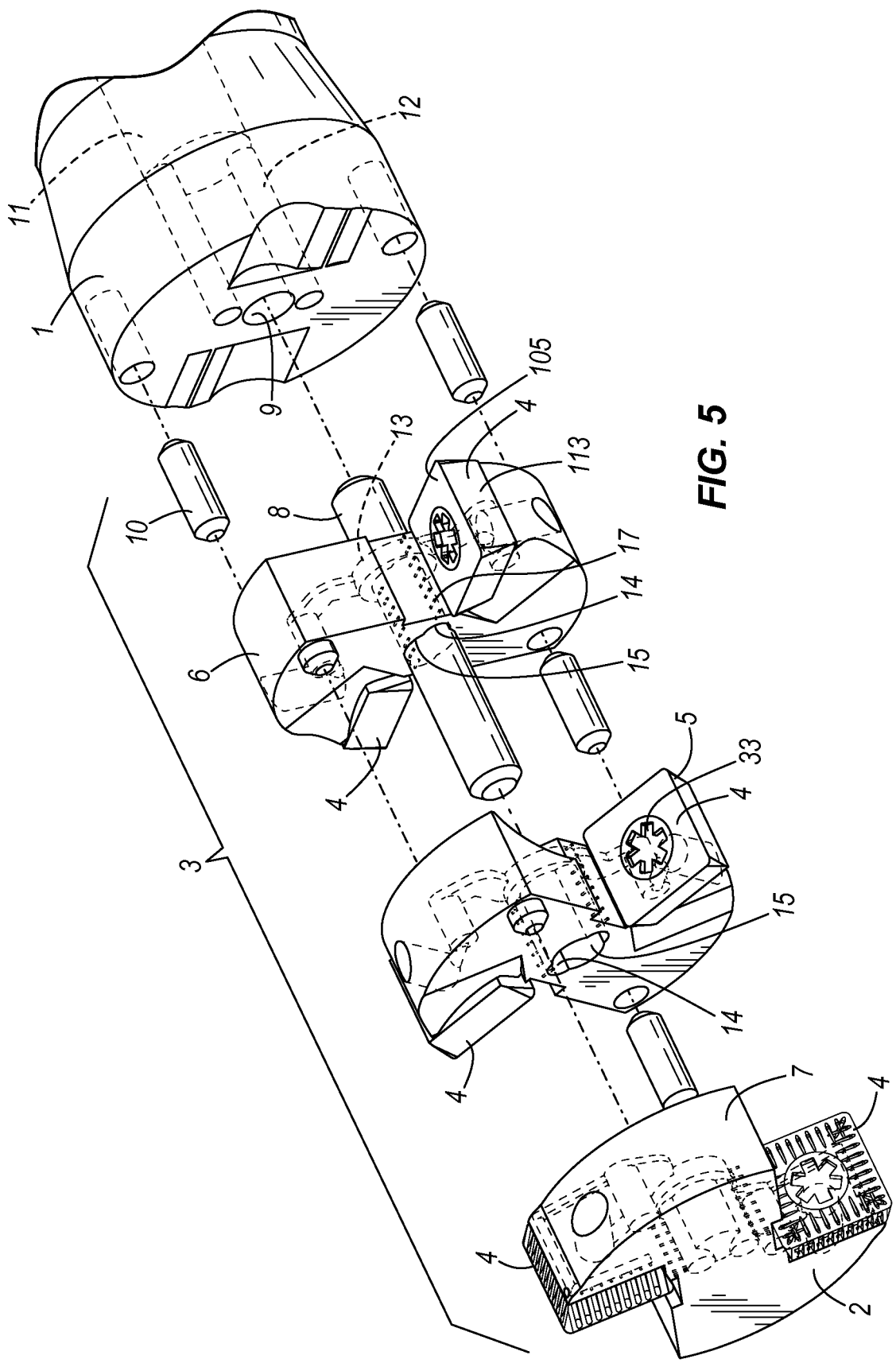
FIG. 5 is an exploded view of an end mill assembly according to the present invention.

Shown in FIG. 5 is an inserted end mill, of small size relative to the size of the inserts; specifically it is to scale at a 0.75-inch cutting diameter with square inserts having an inscribed circle of 0.25 inch and a thickness of 0.125 inch. Shown in the illustration are three levels of teeth/inserts along the axial dimension and two teeth/inserts at each axial level distributed around the circumference. The Shank 1 that mounts to the spindle is to the right and the Working End 2 of the Tool Body 3 is to the left. The Tool Body 3 is constructed in layers to enable the transmission of cutting fluid from the location it enters into the Shank 1 from the spindle (at the cutting-tool axis at the end of Shank 1) out to close proximity of each Insert 4. Each Insert 4 includes a Rake Face 105, a Flank Face 113, and a Cutting Edge 5 at the intersection of the Rake Face 105 and Flank Face 113. The Inserts 4 are mounted to the Tool Body 3 by way of an Insert Mounting Provision 33, which in the illustrated embodiment is a screw but may in other embodiments be another type of fastener. The Insert Mounting Provision 33 extends through the Rake Face 105 and attaches into the Tool Body 3.

Figure 9:
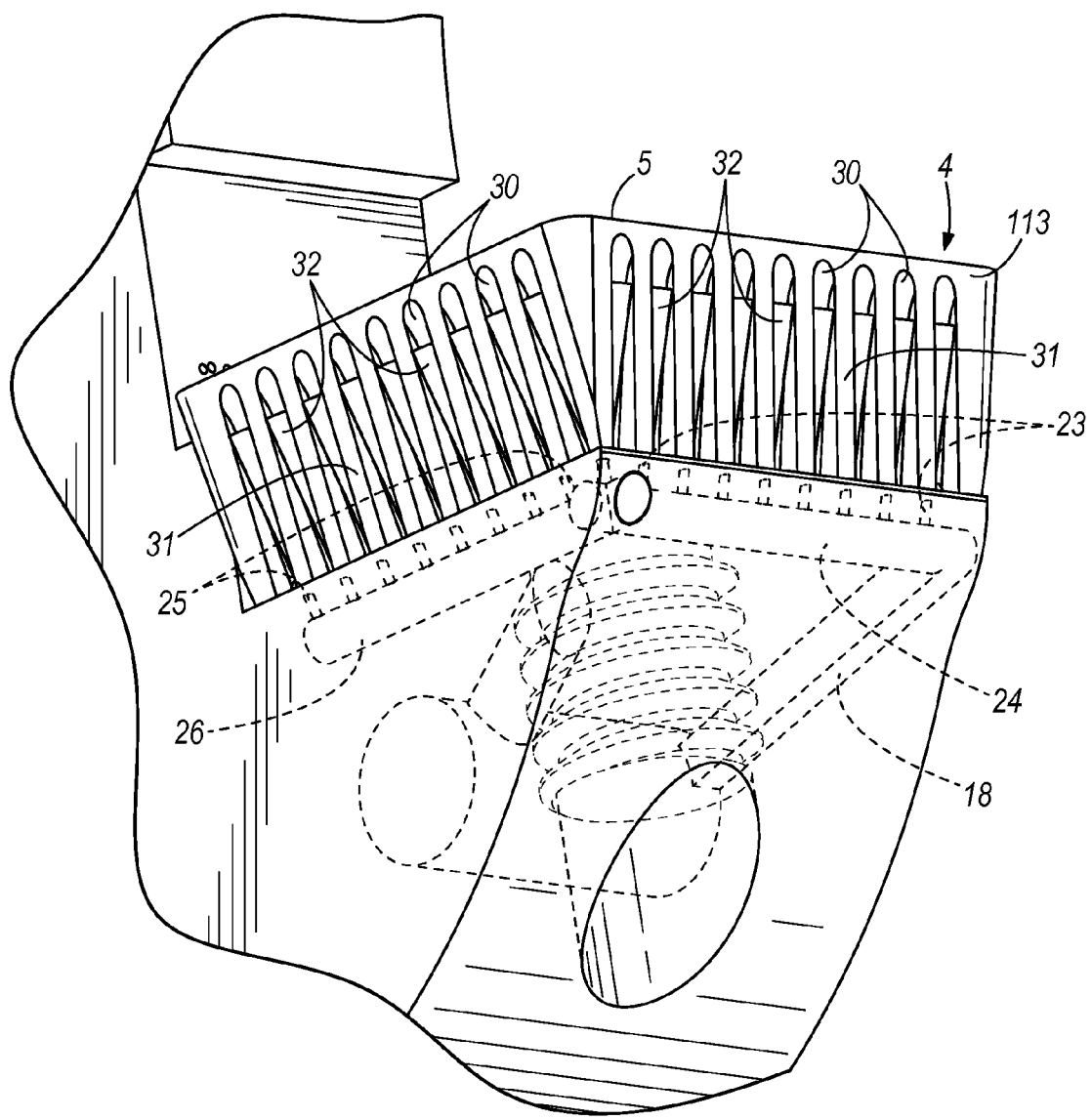
FIG. 9 is an enlarged perspective view of a layer of the end mill assembly of FIG. 5.
Figure 10:
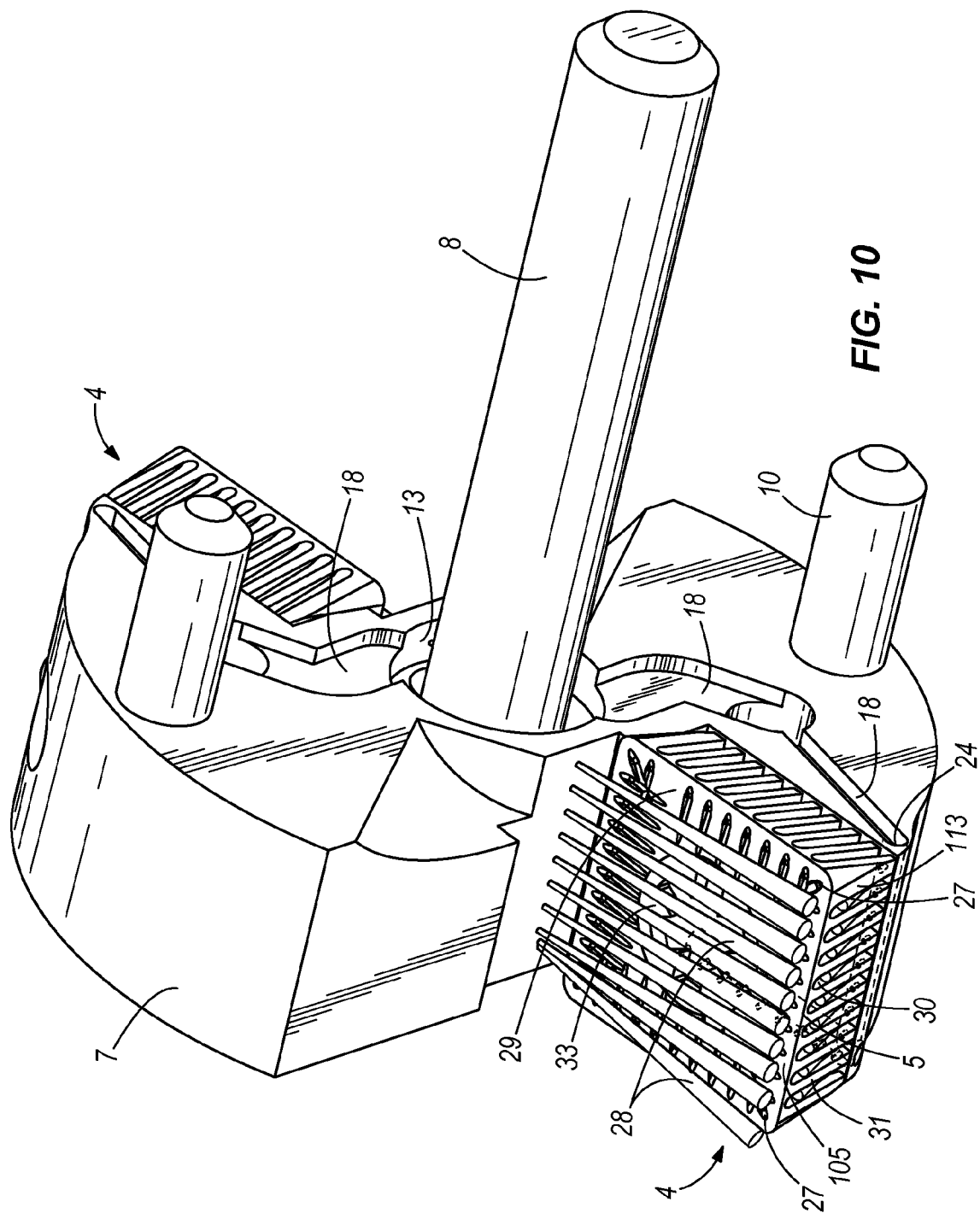
FIG. 10 is an enlarged perspective view of the layer illustrated in FIG. 9, but from a different perspective.

With reference to FIGS. 9 and 10, the Tool Body 3 includes a plurality of Rake-Face Micro-Nozzles 17 and a plurality of Flank-Face Micro-Nozzles 23. Each of the Micro-Nozzles 17, 23 has an exit diameter of not more than 0.1 mm. Forcing the cutting fluid through the Rake-Face Micro-Nozzles 17 and Flank-Face Micro-Nozzles 23 results in respective Rake-Face Micro-Jets 28 and Flank-Face Micro-Jets 32. The Rake-Face Micro-Jets 28 and Flank-Face Micro-Jets 32 are directed in close proximity along or adjacent to the respective Rake Face 105 and Flank Face 113 to a point proximate the Cutting Edge 5 of the Insert 4. The Insert Mounting Provision 33 is at least flush with the Rake Face 105 (i.e., the head of the fastener is flush with or countersunk into the Rake Face 105, but does not protrude above the Rake Face 105), to provide an unobstructed pathway for the Rake-Face Micro-Jets 28 to reach the Cutting Edge 5.

As explained and illustrated above with respect to FIG. 4, the use of Micro-Jets 28, 32 permits this "close proximity" of the jets and differentiates the Tool Body 3 of the present invention from known one-piece tool bodies that can be used when traditional large nozzles are created by drilling a single hole from an insert pocket to the coolant that is fed up the hollow axis of the single-piece tool body.

Referring again to FIG. 5, the layers are referred to by number, beginning with "Layer #1" otherwise referred to as "First Layer" 6 that is attached to the shank and ending with the final or "End Layer" 7 at the Working End 2 of the Tool Body 3 (Layer #3 in this illustration). Each layer holds one or more Inserts 4 (two per layer in this illustration) distributed angularly and each at the axial level associated with that layer. The layers are assembled such that they are located radially relative to one another by a Central Alignment Pin 8 that is affixed in a Shank Central Hole 9 in Shank 1. The layers are located angularly relative to one another by one or more Angular Locating Pins 10 (two per interface in this illustration; one of the two pins in each of Layers #1 and #2 are shown in their hole rather than exploded out). These Angular Locating Pins 10 traverse to each side of a layer-to-layer or the layer-to-shank interface, but not all the way through any one layer. The teeth in this illustration wrap around the Tool Body 3 in a negative helix relative to a usual end mill; conversely, it could be viewed as a very large positive helix. The helix can be opposite and the same in magnitude as that shown given the inclusion of some additional consideration for axially supporting and locating each insert; the noted axial support and locating is achieved in this illustration (negative helix embodiment) by contact of the axially-facing insert flank surface with a mating surface on the face of its next adjacent layer, i.e., the one immediately closer to the Shank 1 (or the shank itself for the inserts on First Layer 6 (Layer #1)).

Figure 6:
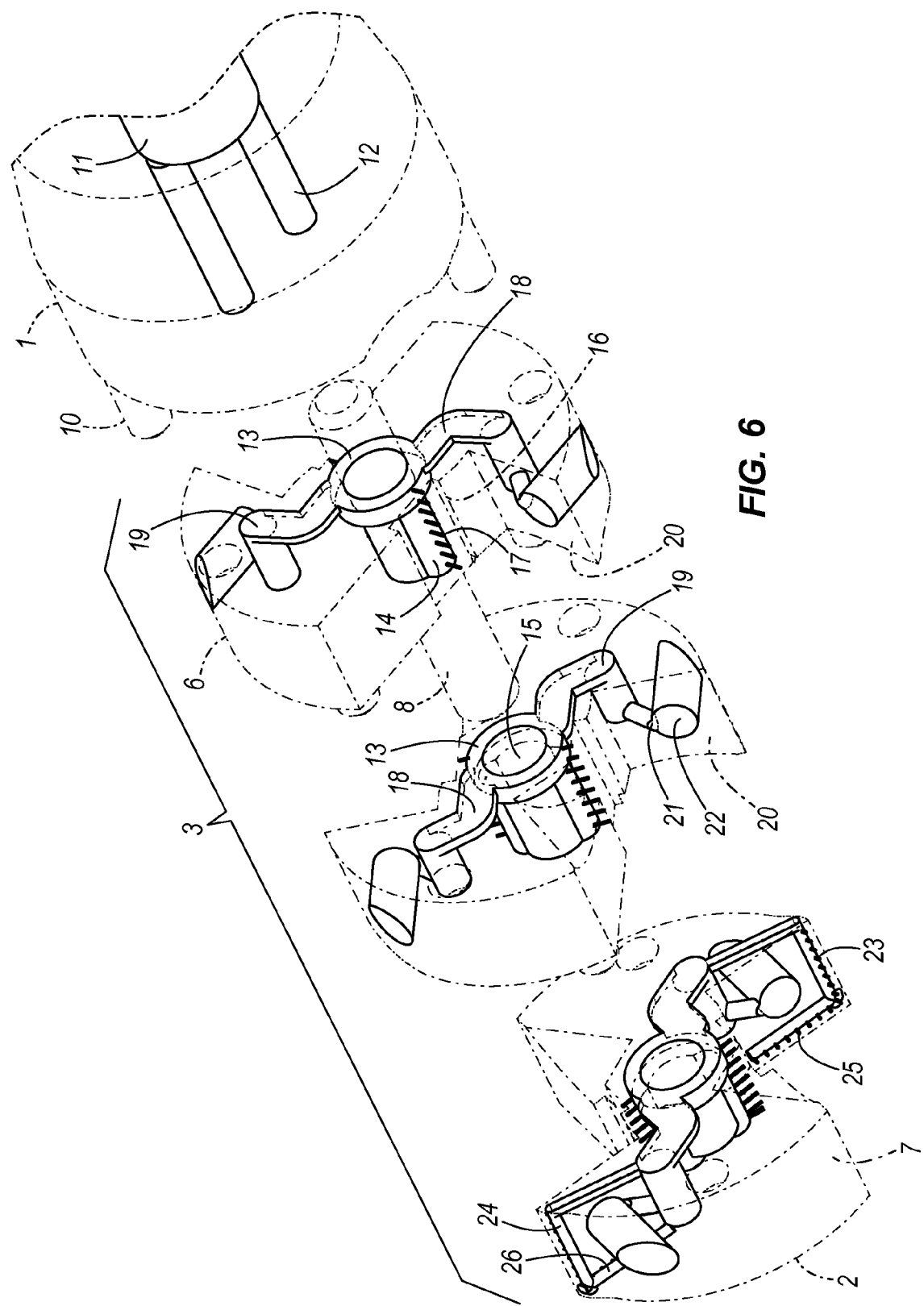
FIG. 6 is an enlarged exploded view of the end mill assembly of FIG. 5.

The exploded assemblies in FIGS. 5 and 6 focus on the manner in which the Tool Body 3 is made, in the layered fashion described, so as to provide internal passages to bring the cutting fluid to the close proximity of each insert. The cutting fluid passages are seen as dashed hidden lines in FIG. 5 and highlighted as solid lines (with all other lines dashed) in FIG. 6 where all passages are called out. The terms "cutting fluid passage," "feed passage," and "flow passage" refer to the combination of the following passages which will be described below: a Primary Shank Passage 11, Secondary Shank Passages 12, Circumferential Passages 13, Interlayer Passages 14, and Intralayer Passages 18. The flow passage delivers a flow of cutting fluid from a source of cutting fluid to the Rake-Face Micro-Nozzles 17 and Flank-Face Micro-Nozzles 23.

The transmission of cutting fluid is achieved as follows: The cutting fluid enters the cutting tool from the spindle through a Primary Shank Passage 11 that is an axially oriented hole concentric with the shank. The cutting fluid then progresses through one or more (two illustrated) Secondary Shank Passages 12 offset radially from the shank axis but in such a way as to intersect with the Primary Shank Passage 11. In other words, each Secondary Shank Passage 12 extends parallel, but non-collinearly with the Primary Shank Passage 11.

The cutting fluid then fills a Circumferential Passage 13 on First Layer 6 (Layer #1). The Circumferential Passage 13 is easily manufactured as a circular recess that surrounds the Central Alignment Pin 8 and, upon mating to and sealing with Shank 1 and the Central Alignment Pin 9, becomes a closed passage. The Circumferential Passage 13 communicates with Secondary Shank Passage 12. The Circumferential Passage 13 allows the cutting fluid to commute to any angular position at the layer-to-shank interface for continued transmission via subsequent passages to (1) close proximity to the Insert(s) 4 on that layer and (2) the next layer. The annular nature of the Circumferential Passage 13 allows these transmissions to be independent of the angular positions of those subsequent passages, which are dictated by the choice of helix angle, and furthermore enables flexibility in the design of those subsequent passages.

The subsequent passages are as follows: The cutting fluid then progresses into Interlayer Passages 14, the number of which generally, though not necessarily in all cases, equals the number of teeth/inserts on the layer. The Interlayer Passages 14 in this illustration are shown to be lobes intersecting with the Layer Center Hole 15 in the layer through which the Central Alignment Pin 8 passes. For cutters that are larger in diameter relative to the insert size, the Interlayer Passages 14 move outward radially so as to stay in the same close radial proximity to the outer tool body surface that radially locates the insert on the Tool Body 3, the Insert Locating Surface 16 (See FIG. 6).

This radially outward movement with the insert is needed to maintain the close proximity of the cutting fluid passage to the Rake-Face Micro-Nozzles 17, which are fed by Interlayer Passages 14. The importance lies in the fact that the Rake-Face Micro-Nozzles 17 are small, around 0.1 mm in diameter, which requires their feeding source to be relatively close as measured in the radial direction so that the micro-holes that are the Rake-Face Micro-Nozzles 17 need not be excessively long or deep in ratio to their diameter. Having them deep in ratio to their diameter is difficult to manufacture and also increases the frictional fluid losses in the Rake-Face Micro-Nozzles 17.

In the case of cutting tools having a larger diameter relative to the insert size, where the Interlayer Passages 14 do not overlap with the Circumferential Passage 13, as an alternative to making the Circumferential Passage 13 much larger in its radial extent each Interlayer Feed Passage 14 is fed from the more centrally located Circumferential Feed Passage 13 (i.e., remaining as illustrated here) by a radial channel (not shown) that, upon mating to and sealing with Shank 1, becomes a closed passage. Of course, the Interlayer Feed Passage 14 is also responsible to transmitting the cutting fluid to the Circumferential Feed Passage 13 in the next layer.

Shown better in FIG. 6, the cutting fluid also progresses from the Circumferential Feed Passage 13 into Intralayer Feed Passages 18, the number of which equals the number of teeth on the layer. The Intralayer Feed Passages 18 communicate between the Circumferential Feed Passage 13 of one layer and the Circumferential Feed Passage 13 of an adjacent layer of the Tool Body 3, and are positioned within the Tool Body 3 a distance from the adjacent Radial Insert Locating Surface 16 no more than 20 times the diameter of the Rake-Face Micro-Nozzles 17. Each Intralayer Feed Passage 18 is easily manufactured as a channel that, upon mating to and sealing with Shank 1 or an adjacent layer, becomes a closed passage. Each Intralayer Feed Passage 18 transmits the cutting fluid to one or more positions of close radial proximity to its respective tooth/insert.

The cutting fluid then may progress in one or both of the following ways: Layers #1 and #2 in FIG. 6 illustrate an option where each Intralayer Feed Passage 18 transmits the cutting fluid via an Axial Supply Passage 19 to a location under the Insert Mounting Surface 20, where the cutting fluid then progresses to an Insert Supply Passage 21 that intersects the Insert Mounting Hole 22 used to mount the Insert 4 (inserts are not shown in FIG. 6; inserts are shown in FIG. 5). This option is used in the case of through-insert cooling according to U.S. Pat. No. 7,802,947, which includes a micro-duct internal to the cutting insert and one or more exhausting micro-jets out the rake face and/or flank face. In this case, the aforementioned Rake-Face Micro-Nozzles 17 may, though not necessarily, be excluded, in which case the Interlayer Passages 14 can remain centrally located even for larger diameter cutters, and need not be provided in number equal to the number of teeth on the layer.

For the sake of simplicity and brevity, only End Layer 7 in FIGS. 5 and 6 shows the other option for use of flank-face micro jets spraying from Flank-Face Micro-Nozzles 23 (openings) and their feed passage. In this case the Intralayer Passages 18 extend out to just short of the outer diameter of the cutter body, decreasing in size to achieve that closeness without breaking through the outer diameter or Insert Mounting Surface 20. The cutting fluid then proceeds through the Axial Flank Passage 24 into which micro-holes like those for the Rake-Face Micro-Nozzles 17 are created to realize Flank-Face Micro-Nozzles 23. These would exist on all layers, though as noted they are shown here only on End Layer 7.

Each Axial Flank Passage 24 is extended via a Radial Flank Passage 26 to allow for End Flank-Face Micro-Nozzles 25 at the end of the Tool Body 3 to cool the end cutting edge of the inserts on End Layer 7 in the case of plunge milling. The Radial Flank Passages 26 are shown as a cross-drilled and plugged hole. It can alternately be created by making End Layer 7 slightly thinner in its axial dimension, cutting a channel on its working end, and then covering the channel with an end cap, having thickness equal to the reduction in axial dimension of End Layer 7, that is brazed or otherwise adhered to and sealed with the working end of End Layer 7. In that case, the Interlayer Passages 14 can break through the axially shorter End layer 7, as can the layer Center Hole 15, as they are closed off by the noted end cap.

In the comparison made earlier in terms of volumetric flow-rate of the micro jet in relation to a traditionally-sized jet, a single 0.1 mm diameter micro jet requires 1% ($\frac{1}{10}^2$) of the coolant of a 1-mm traditionally-sized jet. Shown in the illustrations, the micro-jet approach then allows there to be 10 micro-nozzles distributed in-line with one another resulting in evenly spreading the cutting fluid micro-jets along the edge, in addition to providing improved penetration as discussed relative to FIG. 4. The micro jet approach contradicts the traditional approach of applying a large jet to get large volumes of coolant applied and furthermore as a mechanical means (large-jet force slightly prying the chip) of accessing the heat source, the heat source being evenly distributed along the entire cutting edge. This illustration is for an insert size of 0.25-inch inscribed circle. Doubling the insert size would double the number of micro-jets, hence doubling the volumetric flow-rate for the one tooth, whereas doubling the diameter of a traditional jet to 2 mm would require $2^2=4$ times the volumetric flow rate.

Using micro jets out of the cutting insert according to U.S. Pat. No. 7,802,947 brings the advantage of maintaining the proximity of the micro-nozzles exhausting from the insert, relative to the cutting edge, independent of the size of the insert, whereas the rake-face and flank-face micro jets must move further from the cutting edge with an increase in insert inscribed circle (for the rake-face micro-jets) and/or insert thickness (for the flank-face micro-jets). Positioning the micro-nozzles closer to and of consistent distance from the cutting edge reduces the tendency for and deleterious effects of micro-jet divergence. Also advantageous is the intimacy of cooling proximity that exists internal to the insert, in addition to the micro jets exhausting in close proximity to the cutting edge.

Figure 7:
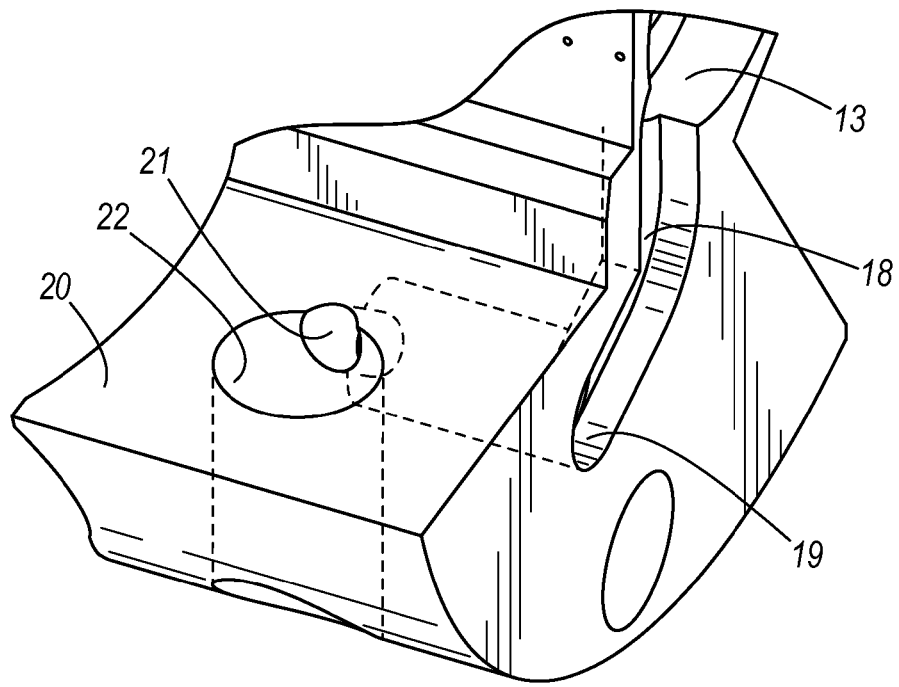
FIG. 7 is an enlarged view of an insert for the end mill assembly of FIG. 5.
Figure 8:
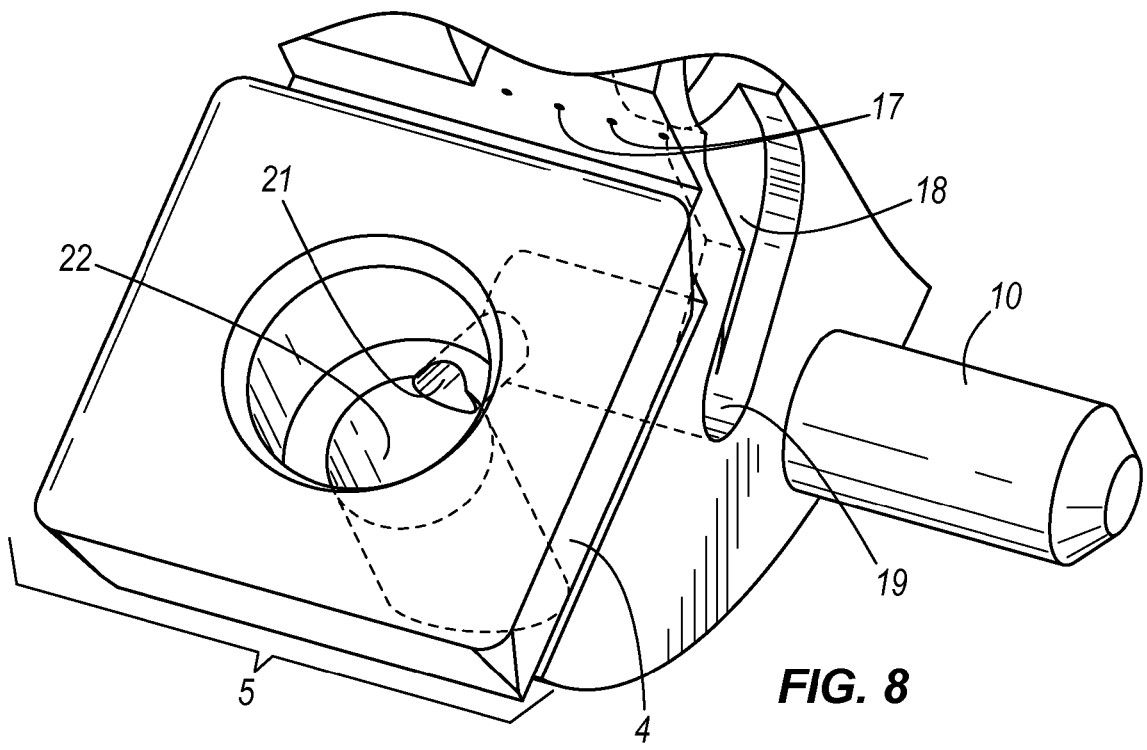
FIG. 8 is another enlarged view of an insert for the end mill assembly of FIG. 5.

Shown in FIGS. 7 and 8 are close-up views of the Insert Mounting Surface 20 and the cutting fluid passages described above that are related to, and needed only in the case of using, an internally-cooled insert.

The layers are attached to one another, and First Layer 6 to Shank 1, by means of braze, adhesive, or welding where it is desired to carry the mechanical loads through this joining medium and also to mostly or fully seal to the outside the internal passages that are manufactured via channeling on the layer faces (while also not internally plugging them). The Angular Orientation Pins 10 may also serve to carry mechanical loading.

The second element of the micro jet cooling invention is the insert with features to allow the Flank-Face Micro-Jets 32 to exit the Tool Body 3 and access the opening between the Flank Face 113 and the Machined Workpiece Surface 114 near to the Cutting Edge 5, and on the Rake Face 105 and/or the Flank Face 113, near the Cutting Edge 5, external micro-geometric surface features that enhance penetration of the associated micro jet cutting-fluid via passive micro-fluidic/capillary action.

This is illustrated in FIGS. 9 and 10, though the smallest of the micro-geometric features are not explicitly shown as they are very small; their location is visually indicated by the larger, though still micro-scale and of size similar to or slightly larger than the micro-jets, associated Divots 27 that receive the Rake-Face Micro-Jets 28 that flow from slightly above the height of Cutting Edge 5 at a shallow angle relative to the Insert Top Surface 29.

The Flank Face 113 includes Flank-Face Micro-Jet Clearance Channels 30. Divots are not shown on the flank-face, although they and the smaller micro-geometric features may also exist on the flank face extending from the Flank-Face Micro-Jet Clearance Channels 30. The Flank-Face Micro-Jet Clearance Channels 30 are the spaces or grooves in the Flank Face 113, and provide an unobstructed pathway for the Flank-Face Micro-Jets 32 to reach the Cutting Edge 5. Between the Flank-Face Micro-Jet Clearance Channels 30 are Edge Support Pillars 31. The Edge Support Pillars 31 extend from the Cutting Edge 5 to a surface of the Insert 4 that mates to the Insert Mounting Surface 20 on the Tool Body 3.

The Divots 27 and smaller micro-geometric features enable added penetration to all regions along the Cutting Edge 5, i.e., both in line with the Flank-Face Micro-Jet Clearance Channels 30 and between them above the Edge Support Pillars 31. So that the Rake-Face Micro-Jets 28 have a clear flow trajectory to Cutting Edge 5 and Divots 27, Cutting Edge 5 must be at or above the extreme of the Insert Top Surface 29 and the Insert Mounting Provision 33.

The smaller micro-geometric features extend from the Divots 27 toward the Cutting Edge 5 and include micro-channels which direct the cutting fluid toward the cutting edge 5. The micro-channels may take the form of crisscrossing micro-channels that form a series of bumps between their intersections. The scale of the micro-channels are such that their depth and width are generally less than 0.25 mm with spacing similar to or less than the size of the adjacent Divot 27. The micro-channels and crisscrossing micro-channels can exhibit a variety of cross-sections that are prone to passively channel a fluid under capillary action, including but not limited to triangular, square, and rounded. Flank-Face Micro-Jet Clearance Channels 30, Edge Support Pillars 31, and Divots 27 may be pressed in the green-state powder compact that is then sintered. Divots 27 and the smaller micro-geometric features (micro-channels and crisscrossing micro-channels) may be formed by pressing or scratching them into the green-state powder compact that is then sintered, or created in the sintered or pre-sintered insert via laser machining, mechanical machining or grinding, electrical discharge machining, or electro-chemical machining.

The Rake-Face Micro-Jets 28 could be created as a fluid sheet (thin and wide rectangular cross-section jet) spanning the entire width of the cutting edge rather than points (multiple individual round cross-section micro-jets) distributed along the cutting edge. However, distributed individual micro-jets have the advantage of providing regions to the sides of the micro jets (i.e., spaces in between the individual micro-jets) where the cutting fluid may circulate out to the side of the micro-jet trajectory thus allowing space for sideways expulsion of the jet fluid along with any possible vapor lock formed, if there is any vaporization, with cutting fluid flow then continuing back outward opposite the micro jet flow direction in the areas between the individual micro-jets. A sheet of cutting fluid would not allow side and back flow in that way. In regard to creating the micro-nozzles, for the rake face or flank face, at least for larger cutters, it is possible to manufacture the micro-nozzle holes in a plate that then is then fastened to the tool, the plate containing an in-line series of adjacent micro-holes where the plate could potentially be replaced.

To summarize, a method of manufacturing the cutting tool includes forming a green-state insert of a green powder compact; sintering the green-state insert to form a hard insert; machining the hard insert to form a finished Insert 4 having a Flank Face 113, a Rake Face 105, and a Cutting Edge 5 at the intersection of the Flank Face 113 and the Rake Face 105; providing a Shank 1 defining a Shank Passage 11, 12; providing a Tool Body 3 defining a Tool Body Passage 13, 18, 19; mounting the Tool Body 3 to the Shank 1 such that the Shank Passage 11, 12 communicates with the Tool Body Passage 13, 18, 19 to define a Flow Passage 11, 12, 13, 18, 19; forming a plurality of Micro-Nozzles 17, 23 in at least one of the Tool Body 3 and the Insert 4, each Micro-Nozzle 17, 23 having an exit diameter of not more than 0.1 mm; mounting the finished Insert 4 to the Tool Body 3; placing the Micro-Nozzles 17, 23 in communication with the flow passage; placing the flow passage in communication with a flow of cutting fluid such that the cutting fluid may flow through the flow passage and out the Micro-Nozzles 17, 23; and producing a Micro-Jet 28, 32 of cutting fluid with each of the Micro-Nozzles 17, 23, each Micro-Jet 28, 32 of cutting fluid being directed adjacent one of the Flank Face 113 and Rake Face 105, toward the Cutting Edge 5 of the Insert 4.

Thus, the invention provides, among other things, a cutting tool that includes micro-nozzles formed in at least one of the tool body and the insert, and aimed at the cutting edge. Various features and advantages of the invention are set forth in the following claims.

The invention claimed is:

1. A cutting tool comprising:
   a shank;
   a tool body mounted to the shank; and
   an insert defining a flank face, a rake face, and a cutting edge between the flank face and rake face;
   micro-nozzles formed in the tool body, each micro-nozzle having an exit diameter of not more than 0.1 mm, the micro-nozzles aimed at the cutting edge; and
   a flow passage adapted for communication with a source of cutting fluid for the receipt of a flow of cutting fluid, the flow passage extending through at least a portion of the shank and a portion of the tool body, the flow passage being in close proximity to an insert locating surface to minimize the length-to-diameter ratio of the micro-nozzles, and the flow passage adapted to deliver the flow of cutting fluid to the micro-nozzles;

wherein, each micro-nozzle generates a micro-jet of cutting fluid in close proximity to the cutting edge, and wherein each micro-jet extends through the flank face and is directed substantially parallel to the flank face.

2. The cutting tool of claim 1, wherein the flow passage includes a primary shank passage, which is centered on an axis of the shank.

3. The cutting tool of claim 2, wherein the flow passage includes at least one secondary shank passage communicating with the primary shank passage and extending parallel but non-collinearly with the primary shank passage.

4. The cutting tool of claim 3, further comprising a central alignment pin interconnecting the tool body with the shank; wherein the flow passage includes a circumferential passage surrounding the central alignment pin and communicating with the secondary shank passage.

5. The cutting tool of claim 4, wherein the tool body includes multiple layers of tool bodies; wherein the flow passage includes an intralayer passage communicating between the circumferential passage of one tool body layer and the circumferential passage of an adjacent tool body layer, positioned within the tool body a distance from the adjacent insert locating surface no more than 20 times the diameter of the micro-nozzles.

6. The cutting tool of claim 1, wherein the micro-nozzles include a plurality of rake-face micro-nozzles communicating through the tool body with the flow passage and wherein each of the plurality of rake-face micro-nozzles directs a micro-jet aimed at the cutting edge and extending substantially parallel to the rake face.

7. The cutting tool of claim 1, wherein the flow passage includes at least one intralayer passage communicating with a circumferential passage, the intralayer passage communicating with an axial flank passage which communicates with a plurality of micro-nozzles adjacent the flank face.

8. The cutting tool of claim 1, wherein the flow passage includes a radial flank passage; wherein the micro-nozzles include a plurality of flank-face micro-nozzles receiving cutting fluid from the radial flank passage and generating flank-face micro jets of cutting fluid that extend through and substantially parallel to the flank face and are aimed at the cutting edge adjacent to the flank face.

9. The cutting tool of claim 1, further comprising an insert mounting provision extending through the rake face for mounting the insert to the tool body; wherein the micro-nozzles include rake-face micro-nozzles generating rake-face micro-jets of cutting fluid adjacent to the rake face and directed at the cutting edge; wherein the insert mounting provision is at least flush with the rake face to provide an unobstructed pathway for the rake-face micro jets to reach the cutting edge.

10. The cutting tool of claim 1, wherein the flank face includes flank-face micro-jet clearance channels that are substantially aligned with the flank face micro-nozzles providing an unobstructed pathway for the flank-face micro jets to reach the cutting edge.

11. The cutting tool of claim 10, further comprising support pillars between the flank-face micro-jet clearance channels.

12. The cutting tool of claim 10, further comprising support pillars between the flank-face micro-jet clearance channels; wherein the support pillars extend from the cutting edge to a surface of the insert that mates to the insert mounting surface on the tool body.

13. The cutting tool of claim 1, further comprising divots on at least one of the rake face and the flank face near the cutting edge; wherein the divots are substantially in line with the micro-jets to receive the micro-jets and direct the micro-jets toward the cutting edge.

14. The cutting tool of claim 13, wherein the divots include micro-channels extending toward the cutting edge.

15. The cutting tool of claim 14, wherein the micro-channels have a depth and a width; wherein each of the depth and width is less than 0.25 mm.

16. The cutting tool of claim 15, wherein the micro-channels include crisscrossing micro-channels that form a field of bumps between portions of the micro-channels.

17. The cutting tool of claim 16, wherein the bumps are spaced less than 0.25 mm from each other.

18. The cutting tool of claim 14, wherein the micro-channels have a cross-section that is triangular.

19. The cutting tool of claim 14, wherein the micro-channels have a cross-section that is square.

20. The cutting tool of claim 14, wherein the micro-channels have a cross-section that is rounded.

21. The cutting tool of claim 1, wherein the insert contacts a workpiece and the cutting edge is operable to separate a chip from the workpiece, wherein the chip extends at a first angle with respect to the rake face, wherein the workpiece extends at a second angle with respect to the flank face, and wherein the first and second angles are between about 3 degrees and about 10 degrees.

22. The cutting tool of claim 21, wherein a first micro-jet substantially bisects the first angle and a second micro-jet substantially bisects the second angle.

23. The cutting tool of claim 1, wherein the micro-nozzles include a first plurality of micro-nozzles that each generate a micro-jet that extends through and substantially parallel to a first surface, and a second plurality of micro-nozzles that each generate a micro-jet that extends substantially parallel to a second surface, and wherein the first surface is one of the rake face and the flank face and the second surface is the other of the rake face and the flank face.

* * * * *